(12) United States Patent
Hockmeyer

(10) Patent No.: US 7,836,628 B2
(45) Date of Patent: Nov. 23, 2010

(54) LURE WITH INSERTABLE HOOK ANCHOR

(76) Inventor: Wayne Hockmeyer, P.O. Box 100, West Forks, ME (US) 04985

( * ) Notice: Subject to any disclaimer, the term of this patent is extended or adjusted under 35 U.S.C. 154(b) by 639 days.

(21) Appl. No.: 11/716,442

(22) Filed: Mar. 9, 2007

(65) Prior Publication Data
US 2008/0216384 A1  Sep. 11, 2008

(51) Int. Cl.
A01K 85/00 (2006.01)
(52) U.S. Cl. ................... 43/42.08; 43/42.36; 43/42.49
(58) Field of Classification Search ............ 43/42.08, 43/42.36, 42.49, 42.53, 44.92
See application file for complete search history.

(56) References Cited

U.S. PATENT DOCUMENTS

| 3,818,626 A | 6/1974 | Peippo |
| 3,855,722 A | 12/1974 | Moore |
| 4,785,569 A * | 11/1988 | Thomas, Jr. ............. 43/42.31 |
| 5,070,639 A | 12/1991 | Pippert |
| 5,595,015 A * | 1/1997 | Jensen ................. 43/42.06 |
| 5,953,849 A * | 9/1999 | Boucher, Jr. ............ 43/42.24 |
| 6,052,938 A | 4/2000 | Marusak et al. |
| 6,061,948 A | 5/2000 | Boucek |
| 6,145,239 A | 11/2000 | Hirahara et al. |
| 6,182,391 B1 | 2/2001 | Hubbard |
| 6,266,916 B1 | 7/2001 | Dugan |
| 6,718,683 B2 | 4/2004 | Hawkins |
| 6,813,857 B2 * | 11/2004 | Payer ..................... 43/42.4 |
| D513,057 S * | 12/2005 | Mueller ................. D22/131 |
| 2006/0260178 A1* | 11/2006 | Jones et al. ............. 43/42.36 |
| 2006/0260179 A1* | 11/2006 | Guigo .................... 43/42.36 |

* cited by examiner

*Primary Examiner*—Christopher P Ellis
(74) *Attorney, Agent, or Firm*—Edwin Tarver, Esq.; Lauson & Tarver, LLP

(57) ABSTRACT

A fishing lure comprising a resilient soft bodied bait and a hook attaching device, wherein the soft bodied bait includes a first hole extending along the width of the soft bodied bait near its head portion and a second hole extending perpendicularly from the center of the first hole till the exterior of the bait and a slit dividing the head portion and the second hole. The hook attaching device comprises an elongated member adapted to be securely received in the first hole, a stem adapted to be securely received in the first hole and an eyelet on the stem. The stem extends perpendicularly from the center of the elongated member and is substantially of the same length of the second hole. The hook attaching device is inserted in the bait; and the nose portion of the soft-bodied bait is resiliently pushed back to expose the eyelet for inserting a fish hook.

14 Claims, 6 Drawing Sheets

LURE WITH INSERTABLE HOOK ANCHOR

CROSS-REFERENCE TO RELATED APPLICATION

None

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates to fishing lures, and more particularly to an artificial fishing lure having a soft bodied bait and a hard hook attachment device inserted into holes located on a soft-bodied bait.

Artificial fishing lures that mimic live bait in water and known in the art. The size and shape of an artificial fishing lure depends on the type of fish intended to be caught. Artificial fishing lures comprise either rigid or soft bodied structures. Typically, soft bodied lures are pierced with fish hooks. Devices for use in conjunction with existing fishing lures have also been developed to attach fish hooks and to alter the appearance of a lure.

For example, U.S. Pat. No. 6,061,948 to Boucek discloses a mountable head adapted to be fitted to any existing fishing lure such as a worm. The mountable head has a head portion having a hollow receiving chamber with an opening and attaching components located near the perimeter of the opening. The attaching components are projections or barbed pieces that can be depressed or bent inwardly into the receiving chamber to engage the fishing lure. Various colored eyes are painted on or attached to the head portion to resemble baits upon which fish prey. An eyelet access opening is provided on the head portion to attach a fishing line. This mountable head is used to alter the appearance of an existing soft fishing lure unlike the instant invention, which provides a weighted hook-attaching device for soft bodied bait.

U.S. Pat. No. 6,052,938 to Marusak discloses a modular fishing lure comprising a frame and a plurality of soft outer bodies that are adapted to be accepted by the frame and to fit over at least a portion of the frame. The outer bodies are secured to the frame by inserting eyes, which extend from the frame, into eye sockets formed in the soft outer bodies. The soft outer bodies are removable and can be interchanged without untying the fishing line from the frame. The eyes can also be removed from the frame and interchanged. The structure of the frame and the method of securing the frame and soft outer bodies are different from the present invention, which includes a hook-attaching device that can be inserted in specially designed soft bodied bait.

U.S. Pat. No. 6,718,683 to Hawkins discloses a reusable simulated bait fish lure with a weighted hook having a curved, barbed hook at one end and a weighted torpedo-like head at the other end. The bait body has an interior cavity shaped to receive the head with a tight friction fit and a passageway that is narrower than the cavity extending between the cavity and the exterior of the bait body. The head can be inserted into the bait body through the flexible passageway and into the cavity with the barbed hook protruding out of the bait body. The bait lure is cast of rubberized material in a variety of sizes and shapes depending on the target fish and its environment. Although the weighted hook can be inserted in the bait body, the structure involved to facilitate insertion, for example, the torpedo-like head and the cavity in the bait body, is different from the instant invention. Also, the fish hook is not a part of the fishing lure of the present invention.

Typically, in order to attach a fish hook to artificial soft bodied bait, the bait body has to be impaled and a fish line connected to the hook. If a user wants to change the bait using the same fish line, the hook must be removed from the bait body, which damages the bait body and reduces its usable life. Moreover, a hook directly attached to a soft bodied bait can impair the desired movement of the bait in water. It is therefore an object of the present invention to overcome these limitations.

A further object is to provide a fishing lure that includes a hook attaching device and a soft bodied bait adapted to securely receive the hook attaching device.

Finally, it is an object of the present invention to provide a fishing lure that includes a separate hook attaching device with an eyelet for attaching a fish hook without piercing the soft bodied bait. These and other objects of the present invention will become better understood with reference to the appended Summary, Description, and Claims.

SUMMARY

The present invention is a fishing lure comprised of a soft bodied bait body and a hook attaching device for attaching a fish hook to the soft bodied bait. A fish hook may therefore be attached to the fishing lure without piercing the lure. The lure body includes a first hole extending between its eyes and a second hole extending perpendicularly from the center of the first hole to the anterior of the lure body. The hook attaching device is a unitary piece comprising of a cylindrical elongated member, a stem extending perpendicularly from the center of the elongated member, and a hook eyelet on the stem.

When the hook attaching device is inserted, the ends of elongated member protrude from the fish body, resembling the eyes of a fish, and the eyelet is concealed in the bait body. In order to insert a hook, the snout portion of the bait body is resiliently pushed back to expose the eyelet. Following this, the hook is inserted through the eyelet and the snout portion is released, thereby regaining its original position and anchoring the hook in place.

FIGURES

Reference Numerals

Figure 1:
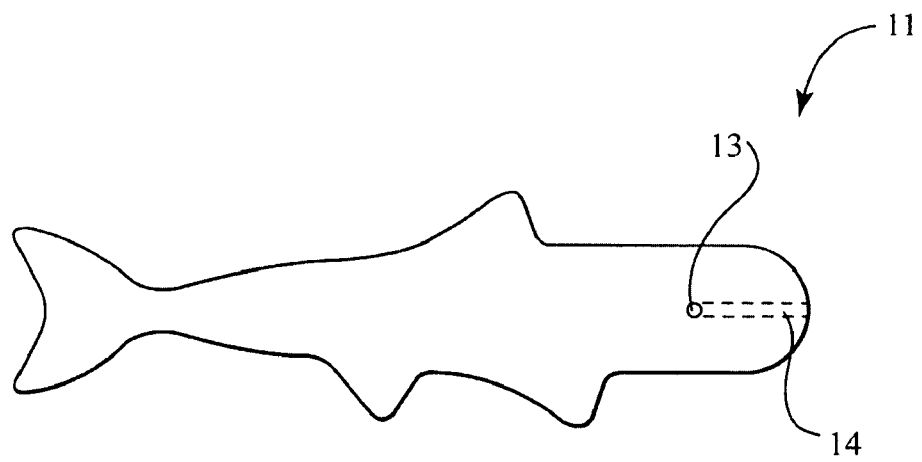
FIG. 1 is a side view of the soft-bodied bait in accordance with the present invention.

10 . . . Fishing Lure
11 . . . Soft-bodied Bait
12 . . . Hook-attaching Device
13 . . . First Hole
14 . . . Second Hole
16 . . . Elongated member
17 . . . Stem
18 . . . Eyelet
19 . . . Cylindrical Central Section
20 . . . Semispherical End
21 . . . Thin Cylindrical Central Portion
22 . . . Fish Hook
23 . . . Snout Portion of the Soft-bodied Bait
24 . . . Hole in an Alternate Embodiment of the Eyelet
25 . . . Slit in an Alternate Embodiment of the Eyelet

DETAILED DESCRIPTION

Referring to the drawings, a preferred embodiment of the fishing lure of the present invention is illustrated in FIGS. 1 through 9. The fishing lure 10 comprises a soft bodied bait piece 11 and a hook attaching device 12 to be received within the soft bodied bait 11. A fish hook may therefore be attached without piercing the soft bodied bait 11.

Figure 2:
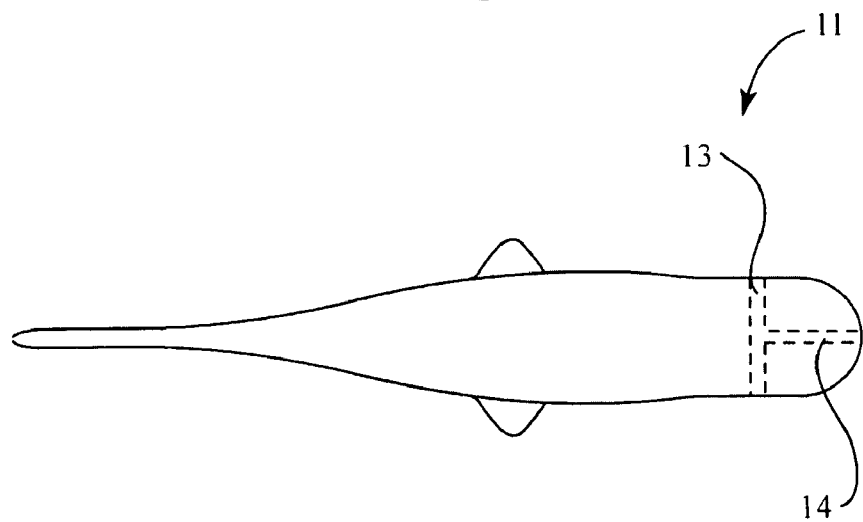
FIG. 2 is a top view of the soft-bodied bait in accordance with the present invention.

Referring to FIGS. 1 and 2, the soft-bodied bait 11 includes a first hole 13 and a second hole 14. The first hole 13 extends along the width of the bait body 11 at its head portion. More specifically, the first hole 13 extends between the eyes of the bait body. The second hole 14 is perpendicular to the first hole 13 and extends from the center of the first hole 13 to the exterior of the bait body.

Figure 3:
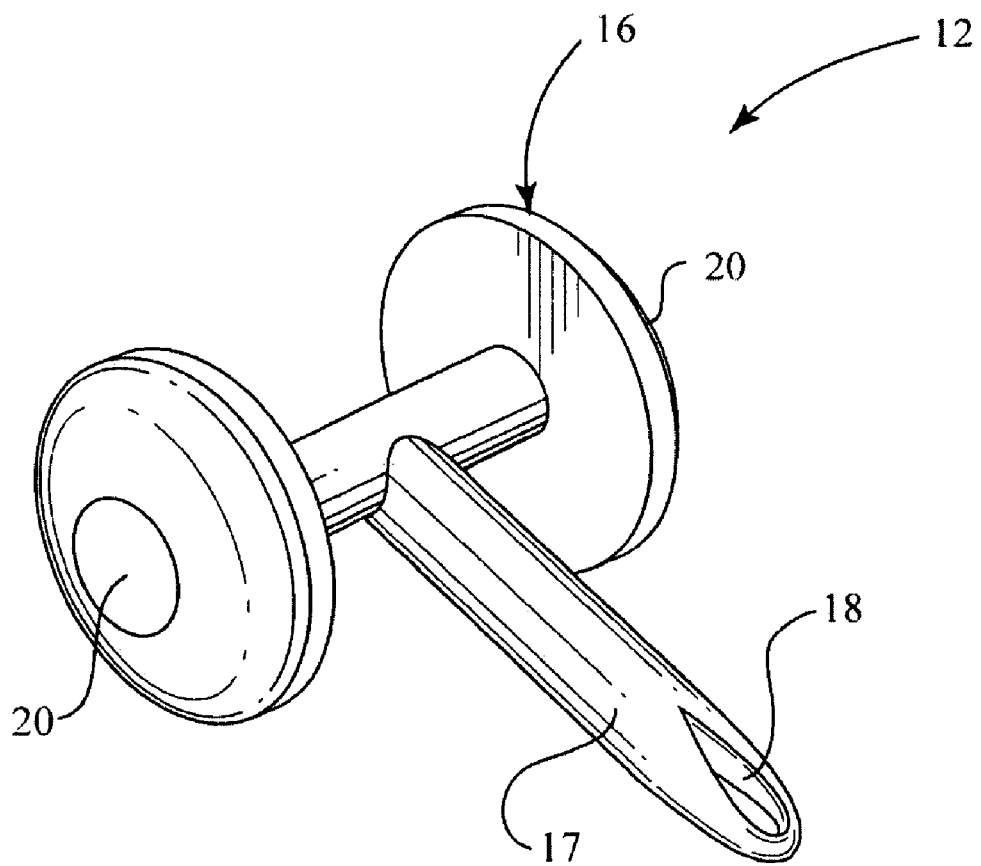
FIG. 3 is a perspective view of a first embodiment of the hook-attaching device in accordance with the present invention.
Figure 4:
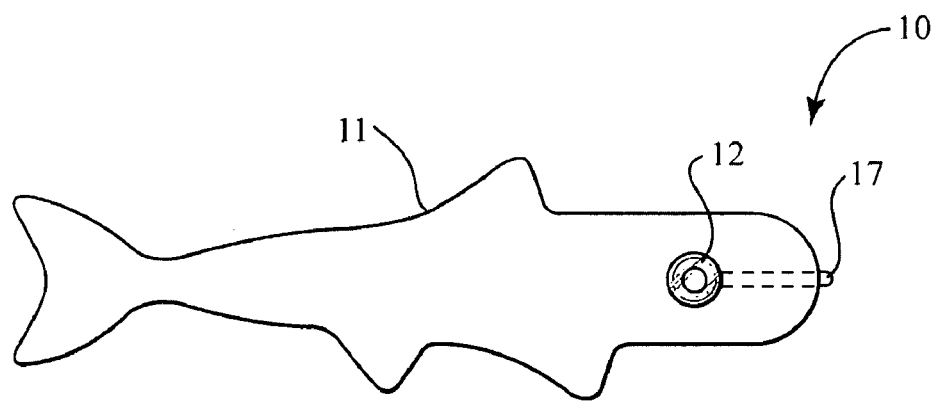
FIG. 4 is a side view of the soft-bodied bait with the hook-attaching device.
Figure 5:
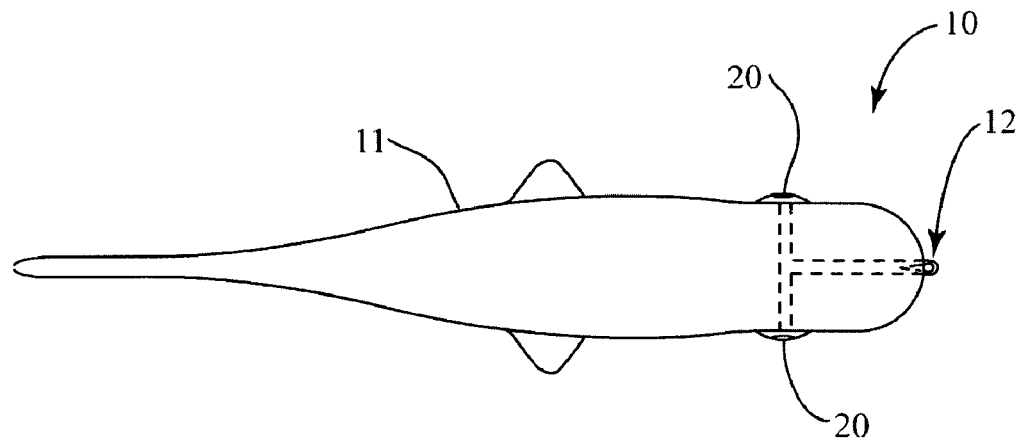
FIG. 5 is a top of the soft-bodied bait with the hook-attaching device.

Referring to FIGS. 3 through 5, the hook attaching device 12 comprises a unitary piece comprising an elongated member 16, a stem 17 extending perpendicularly from the center of the elongated member 16, and an eyelet 18 on the stem 17. The elongated member 16 comprises a cylindrical central section 19 with two semispherical ends 20. The device 12 is inserted in the bait body through the slit 15. The central section 19 and the stem 17 are adapted to be securely received in the first hole 13 and second hole 14 respectively. When the device 12 is inserted, the semispherical ends 20 protrude out of the bait body, and resemble the eyes of a fish. The eyelet 18 on the stem is concealed in the bait body.

Figure 6:
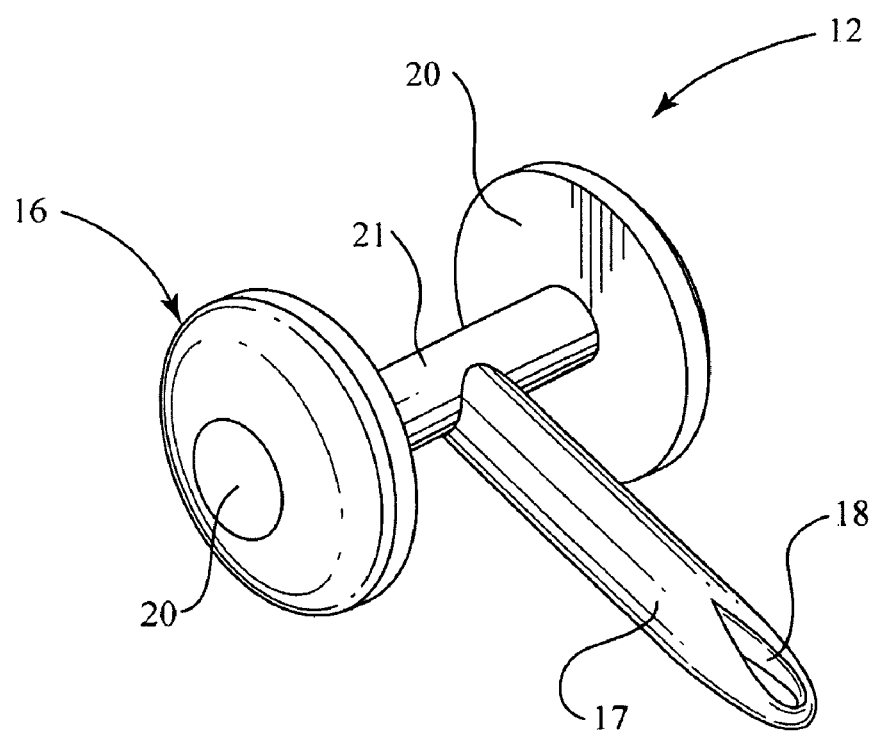
FIG. 6 is a perspective view of the hook-attaching device including painted or coated eyes in accordance with the present invention.

Referring to FIG. 6, the elongated member 16 resembles a dumbbell and is comprised of two opposing semispherical ends 20 connected by a thin cylindrical central portion 21. When the device 12 is inserted, a portion of the semispherical ends 20 protrude out of the first hole 13 and resemble the eyes of a fish. The exposed portions of the semispherical ends 20 may be painted to better mimic the eyes of a fish. While the elongated member is dumbbell shaped in one preferred embodiment, other embodiments are contemplated wherein the elongated member comprises a cylinder.

The eyelet 18 comprises several designs to attach a fish hook. In one embodiment, the eyelet 18 is formed by a pliable plastic layer including a slit or slits. A fish hook can be forcibly inserted through the slit. The layer can comprise a single slit or a plurality of individual slits meeting at a point, resulting in a shape, such as a 'T' shape, '+' shape, 'X' shape, adapted to prevent the barb of the hook from slipping back through the eyelet.

In another embodiment, the eyelet is covered with a flexible layer that can be easily penetrated by the barb of the hook, a resilient material can be used for the flexible layer. Once the hook is inserted, due to the flexible nature of the layer, the layer collapses onto the hook preventing the barb of the hook from slipping back through the eyelet.

Figure 7:
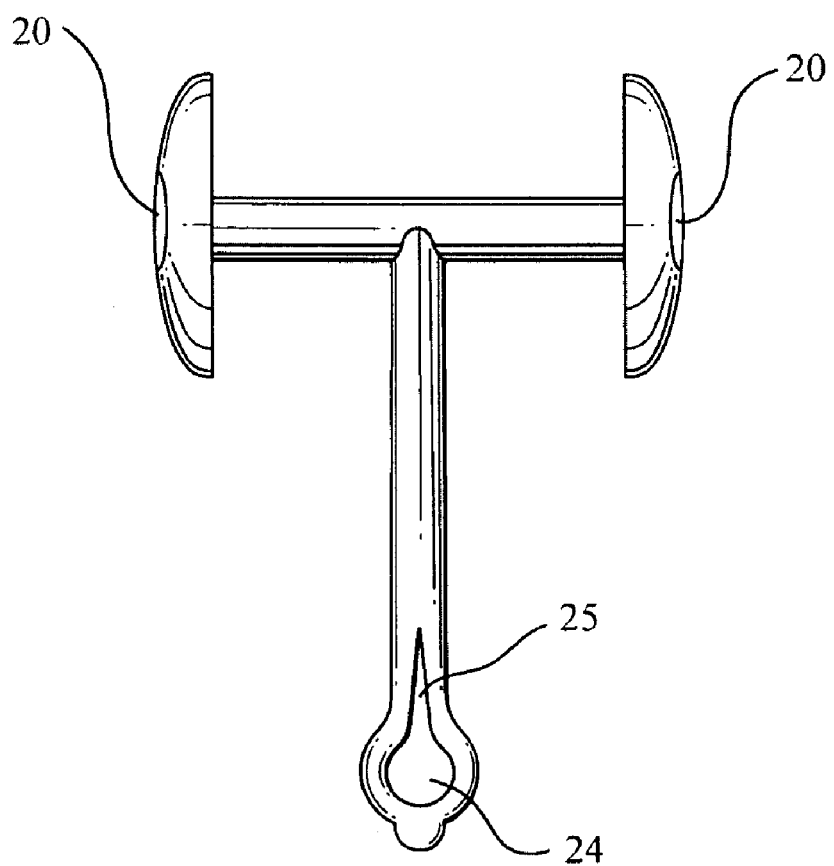
FIG. 7 is an illustration showing an embodiment of the eyelet design in accordance with the present invention with a slit to accommodate a fish hook.

Referring to FIG. 7, the eyelet 13 comprises a hole 24 and a slit 25 immediately behind the hole. A fish hook can be attached by forcing the hook and barb through the hole. The slit 25 expands under pressure, increasing the diameter of the hole 24 and allows the barb to pass through the hole. Once the barb passes completely through the hole, the hole contracts to its original size and the barb can no longer slip back through the hole. In order the detach the hook, the barb is aligned opposite of the slit and the hook itself is forced into the slit, increasing the size of the hole and allowing the barb to pass through the hole. This configuration allows hooks of many different sizes to be used regardless of the wire size of the particular hook.

Figure 8:
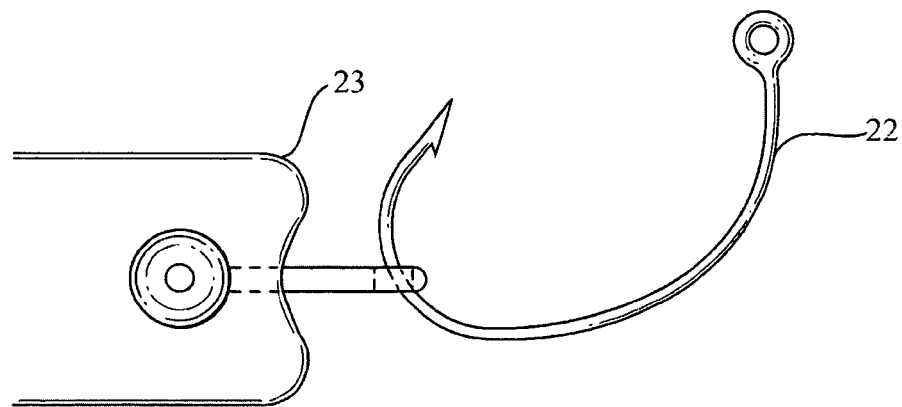
FIGS. 8 and 9 are illustrations showing the steps involved in attaching a fish hook.
Figure 9:
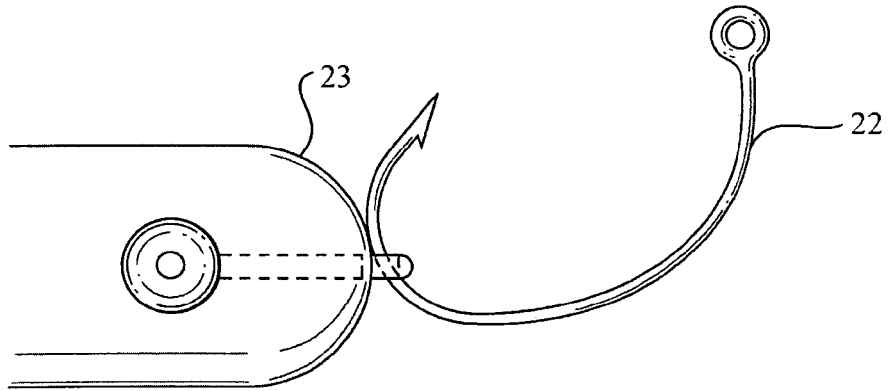

Referring to FIGS. 8 and 9, in order to insert a fish hook 22 into the eyelet after the device is inserted in the soft bodied bait, the snout portion 23 is pushed backwards until the eyelet 18 is exposed. The fish hook 22 is then inserted in the eyelet 18 and the snout portion 23 is released. Since the bait body 11 is resilient, the snout portion 23 retains its original shale and presses tightly against the fish hook 22. The fish hook 22 is therefore held between the snout portion 23 and the boundary of the eyelet 18.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. An improved fishing lure device comprising:
    a. a resiliently deformable soft bodied fish shaped bait member having a first bore extending through the bait member, and a second bore extending from a point along the length of the first bore to the exterior of the bait member; and
    b. an anchor member to be received within the bores of the bait member for attaching a fish hook, comprising a first part to occupy the first bore, and a second part to occupy the second bore, wherein the first part comprises enlarged end caps anchoring the member in the bait, and the second part comprises a means for attaching a fishing hook.

2. The device of claim 1, wherein the bait member is divided into an anterior head portion and a posterior tail portion.

3. The device of claim 2, wherein the first bore extends through the width of the head portion of the bait member, and the second bore extends perpendicularly from the middle of the first bore to the anterior end of the bait member.

4. The device of claim 1, wherein the first part of the anchor member comprises cylinder with end caps larger in diameter than the cylinder, so that when the anchor member is received in the bait member, the end caps hold the bait member in place.

5. The device of claim 1, wherein the second part of the anchor member comprises a stem extending from the first part and terminates in an eyelet for receiving a fish hook.

6. The device of claim 5, wherein the eyelet comprises a bore covered with a flexible layer which can be penetrated by the fish hook.

7. The device of claim 5, wherein the eyelet comprises a flexible layer and at least one slit in the flexible layer through which a fish hook can be inserted, preventing the fish hook from slipping back through the eyelet.

8. The device of claim 7, wherein a plurality of slits meet at a point, resulting in a shape preventing the barb of the hook from slipping back through the eyelet when miss-aligned.

9. The device of claim 5, wherein the eyelet comprises a hole and a slit, extending from the hole, wherein the slit expands under pressure when a fish hook is inserted, increasing the diameter of the hole and allowing the barb of the fish hook to pass through the hole.

10. The device of claim 1, wherein the bait member extends over the second part of the anchor member, so that after a fish hook is received in the anchor member, the bait member presses against the fish hook.

11. The device of claim 4, wherein the first part of the anchor member comprises a central portion with two semispherical ends, wherein at least a portion of the semispherical ends are exposed on either side of the bait member.

12. The device of claim 11, wherein the semispherical ends comprise colors and shapes to resemble fish eyes.

13. The device of claim 11, wherein the exposed portions of the semispherical ends are painted or coated and formed to resemble eyes.

14. The device of claim 1, wherein the anchor member is weighed to affect the characteristics of the device as it is drawn through water.

* * * * *